United States Patent
Wang et al.

(10) Patent No.: US 6,882,112 B2
(45) Date of Patent: Apr. 19, 2005

(54) CARBON NANOTUBE FIELD EMISSION DISPLAY

(75) Inventors: Yu-Wu Wang, Taichung (TW); Chun-Tao Lee, Hsinchu (TW); Cheng-Chung Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 28 days.

(21) Appl. No.: 10/424,784

(22) Filed: Apr. 29, 2003

(65) Prior Publication Data

US 2004/0051468 A1 Mar. 18, 2004

(30) Foreign Application Priority Data

Sep. 13, 2002 (TW) .................................... 91120974 A (51) Int. Cl.[7] .............................. G09G 3/10; G09G 3/36; H01J 1/62
(52) U.S. Cl. ............................... 315/169.3; 315/169.4; 313/499; 313/500; 345/89; 345/92
(58) Field of Search ..................... 315/169.3, 169.4; 313/499, 500, 505, 503, 506, 498; 345/74–77, 87, 89, 90–92

(56) References Cited

U.S. PATENT DOCUMENTS

| | | | | |
|---|---|---|---|---|
| 5,404,074 A | * | 4/1995 | Watanabe et al. | 313/495 |
| 6,414,444 B1 | * | 7/2002 | Fox et al. | 315/169.3 |

* cited by examiner

*Primary Examiner*—Tuyet Thi Vo
(74) *Attorney, Agent, or Firm*—Birch, Stewart, Kolasch & Birch, LLP (57) ABSTRACT

A nanotube field emission display. The nanotube field emission display includes a nanotube field emission cell, an active device, and a capacitor. The nanotube field emission cell includes a cathode, a gate, and an anode, wherein the cathode has nanotubes for field emission where the gate is used. The active device includes a first electrode, a second electrode, and a control electrode, wherein the second electrode is coupled to the gate of the nanotube field emission cell. The capacitor is coupled between the gate of the nanotube field emission cell and a voltage source to store gate voltage to control illumination and gray level of the nanotube field emission cell.

25 Claims, 9 Drawing Sheets

CARBON NANOTUBE FIELD EMISSION DISPLAY

BACKGROUND OF THE INVENTION

1. Field of the Invention

The present invention relates to a carbon nanotube field emission display, and particularly to an active control applied in a carbon nanotube field emission display.

2. Description of the Related Art

Carbon nanotube field emission display (CNT-FED) is one kind of FED with matrix driving. Each pixel has a cathode, lower plate, with a layer of nanotube for electron emission source and an anode, upper plate, with a transparent electrode for electron attraction. The cathode accelerates electrons to bombard fluorescent material for fluorescence. Arrangements of FEDs of pixels show images. CNT-FED is a high voltage device implemented by two electrodes, anode and cathode, or by three electrodes, anode, cathode, and gate. CNT-FED takes advantage of high voltage and low current to achieve high illumination. In addition to the light and slim properties of LCD (liquid crystal display), CNT-FED has the high illumination properties of CRT (cathode ray tube) displays, making CNT-FED a commercially valuable flat display. The illumination mechanism in three-electrode CNT-FED is briefly described as follows. Fluorescent material is disposed at an anode, and an electron emission source, CNT, with point discharge, is disposed at a cathode. A gate is arranged between anode and cathode to attract electrons from tips of CNTs by high electrical fields and accelerating electrons to bombard the cathode to fluoresce. Therefore, the operating voltage of three-electrode CNT-FED is reduced.

Figure 1:
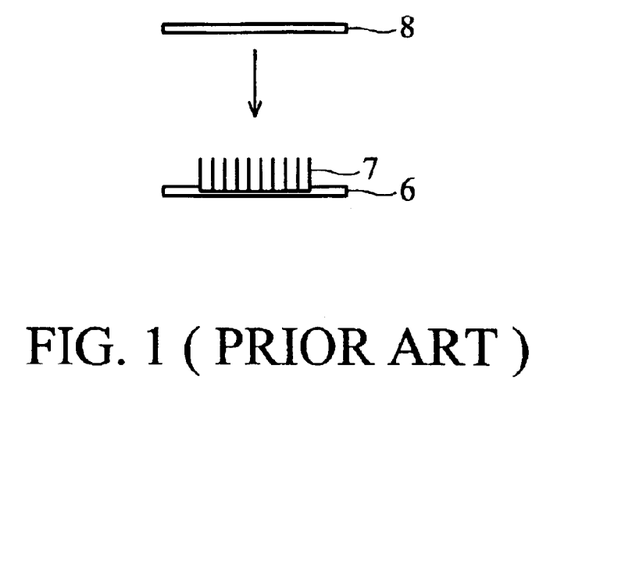
FIG. 1 shows a structure of a two-electrode CNT-FED.
Figure 2:
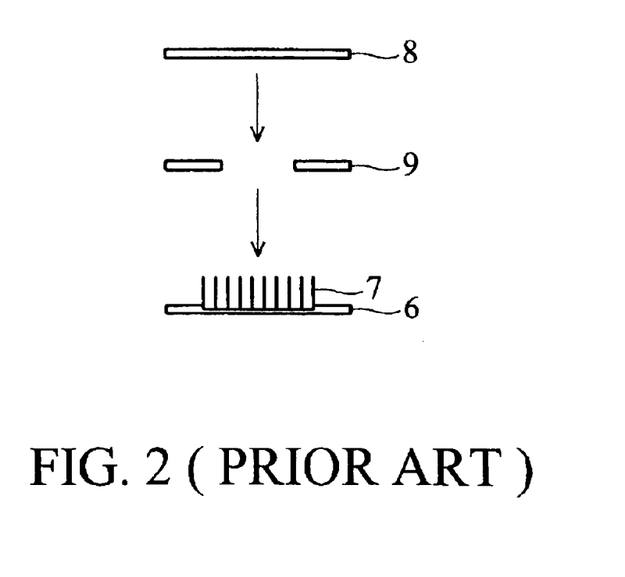
FIG. 2 shows a structure of a three-electrode CNT-FED.

Conventional control of CNT-FED is active or passive control. Passive control is provided by two or three electrodes. FIG. 1 shows a structure of a two-electrode CNT-FED, which has CNT 7, cathode 6, and anode 8. In operating mode, anode 8 provides high voltage inducing field emission at cathode 6, and electrons bombard anode 8 to phosphoresce. In passive control, each pixel is lit instantly by scanning, and duration of providing high voltage at anode 8 is controlled by a PWM (pulse width modulation) signal for adjusting gray level. CNT-FED must provide instantaneous illumination in a short time such that required average illumination is achieved in a frame. The operation of FIG. 1 reduces lifecycle of CNT-FED and requires high control voltages. FIG. 2 shows a structure of three-electrode CNT-FED, which includes CNT 7, cathode 6, anode 8, and gate 9. In normal-on mode, anode 8 provides high voltage to attract electrons from cathode 6, and gate 15 reduces voltage, attracting electrons and achieving low control voltage. Gate 15 also provides a negative voltage to turn off CNT-FED. Gate 15 is utilized to limit the number of electrons to control phosphoresce at anode 8 and controls gray levels. The operation in FIG. 2 still requires PWM signals to control and achieve transient visual, and it also reduces lifecycle.

Figure 3:
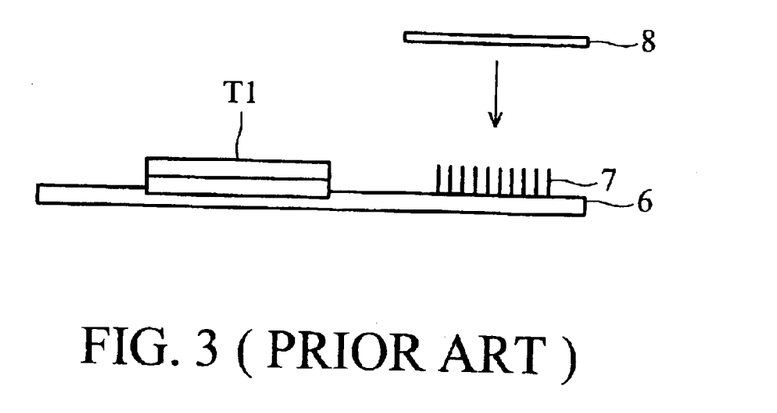
FIG. 3 shows a structure of active control applied in two-electrode CNT-FED.
Figure 4:
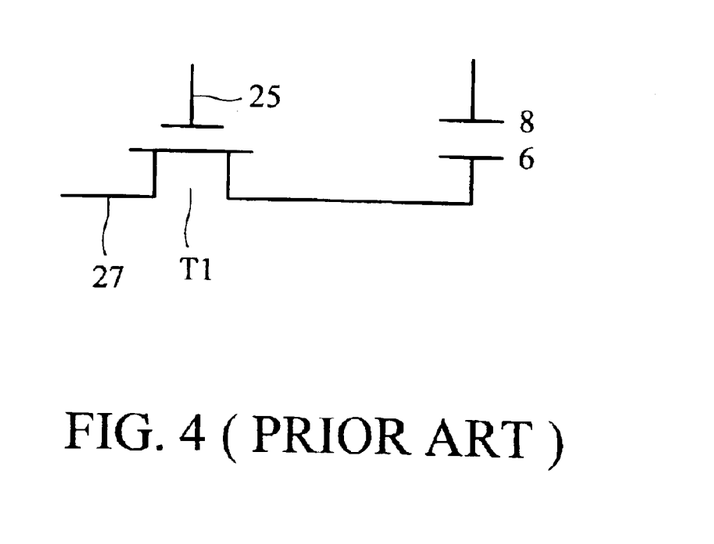
FIG. 4 shows an equivalent circuit of FIG. 3.

FIG. 3 shows a structure of active control applied in two-electrode CNT-FED, which includes an active device T1, such as TFT, and a two-electrode CNT-FED, including CNT 7, cathode 6, and anode 8. FIG. 4 shows an equivalent circuit of FIG. 3. In operating mode, a scan line 25 provides voltage to turn on the active device T1, and a signal line 27 is coupled to cathode 6 by the active device T1 to control field emission, inducing phosphoresce, at cathode 6. The scan line 25 provides voltage to turn off the active device T1, thereby extinguishing phosphoresce at anode. Adjustments of gray level are achieved by controlling the duration of illumination. The structure of FIG. 3 has advantages of low control voltage and high anode voltage but still has disadvantages of high instantaneous illumination and short lifecycle.

In order to eliminate disadvantages of high control voltage, high instantaneous illumination, and short lifecycle, there is a need for a combination of an active device, a capacitor, and a three-electrode CNT-FED, which has the advantages of active control, low control voltage, stored control voltage, preserved gray level, high illumination, and reduced power consumption. The CNT-FED of the present invention has a novel control scheme applied in various processes.

SUMMARY OF THE INVENTION

It is therefore an object of the present invention to provide an active control for a nanotube field emission display.

To achieve the above objects, the present invention provides a nanotube field emission cell with an active device and a capacitor. The nanotube field emission cell includes a cathode, a gate, and an anode. The cathode has nanotube for field emission. The active device includes a first electrode, a second electrode, and a control electrode. The second electrode is coupled to the gate of the nanotube field emission cell. The capacitor is coupled between the gate of the nanotube field emission cell and a voltage source to store gate voltage to control illumination and gray level of the nanotube field emission cell.

According to the active device, the present invention discloses an active control matrix. The active control matrix includes scan lines, data lines, and active devices. Nanotube field emission cells, active devices, and capacitors are disposed at intersections of scan lines and data lines. Scan lines are coupled to control electrodes of active devices. Data lines are coupled to the first electrodes of active devices. The second electrodes of active devices and capacitors are coupled to gates of nanotube field emission cells.

To realize active control, the present invention also provides a nanotube field emission cell with two diodes and a capacitor. A first diode has a first electrode and a second electrode, wherein the second electrode is coupled to the gate of the nanotube field emission cell. A second diode has a first electrode and a second electrode, wherein the first electrode is coupled to the gate of the nanotube field emission cell.

A capacitor coupled between the gate of the nanotube field emission cell and a scan line to store gate voltage to control illumination and gray level of the nanotube field emission cell.

According to the above active control device, the first diode and the second diode, the present invention also discloses an alternative active control matrix. The active control matrix includes scan lines, first data lines, second data lines, nanotube field emission cells, first diodes, second diodes, and capacitors. The nanotube field emission cells, first diodes, second diodes, and capacitors are disposed at intersections of scan lines and first data lines. The scan lines are coupled to corresponding capacitors. The first data lines are coupled to the first electrodes of first diodes. The second data lines are coupled to the second electrodes of second diodes. The first electrodes of the first diodes and the second electrodes of the second diodes are coupled to the capacitors and gates of the nanotube field emission cells.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

The First Embodiment

Figure 5:
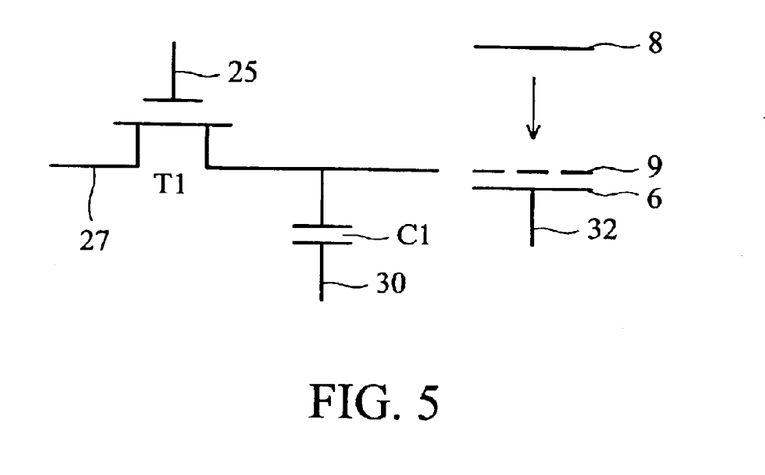
FIG. 5 is a schematic of a CNT-FED with active control in the first embodiment.

FIG. 5 is a schematic of a CNT-FED with active control in the first embodiment. The CNT-FED with active control includes an active device T1, a capacitor C1, and a three-electrode CNT-FED 100 including cathode 6, gate 9, and anode 8. The operating method follows.

1. Anode 8 is fed a high voltage. Cathode 6 is coupled to ground. CNT-FED 100 is in "normally on" state in the abnormal operating mode.
2. In a scan period, a scan signal is fed to the scan line 25, such that the active device T1 is turned on, and the data line is coupled to gate 9 to provide control voltage, thereby controlling field emission at cathode 8, illumination, and gray level. The capacitor C1 stores control voltage of gate 9.
3. In the next scan period, the scan line 25 is fed a voltage to turn off the active device T1. The data line 27 is isolated from gate 9. The capacitor C1 holds control voltage from the previous frame to preserve illumination and gray level.
4. Processes 2 and 3 are repeated. The CNT-FED 100 writes data and preserves illumination and gray level.

Gate 9 can be fed positive voltage or negative voltage. Fed positive voltage, gate 9 attracts electrons, cathode 8 emits electrons, and CNT-FED 100 is in "normally off" state of normal operating mode, that is, turned on only when the scan line is active. Fed negative voltage, the CNT-FED 100 is in "normally on" state in the abnormal operating mode, that is, turned off only when the scan line is active. By gate 9, gray level is adjustable and control voltage is reduced.

Compared with conventional active control of two-electrode CNT-FED in FIGS. 3 and 4, the CNT-FED 100 in the first embodiment stores control voltage by a capacitor and sustains a gray level and illumination in a set time frame. High instantaneous illumination is not required; therefore, CNT-FED has a long lifecycle. Compared with conventional passive control, the CNT-FED in the present embodiment has advantages of power saving, high yielding, long lifecycle, and fabrication at large substrate.

Figure 6:
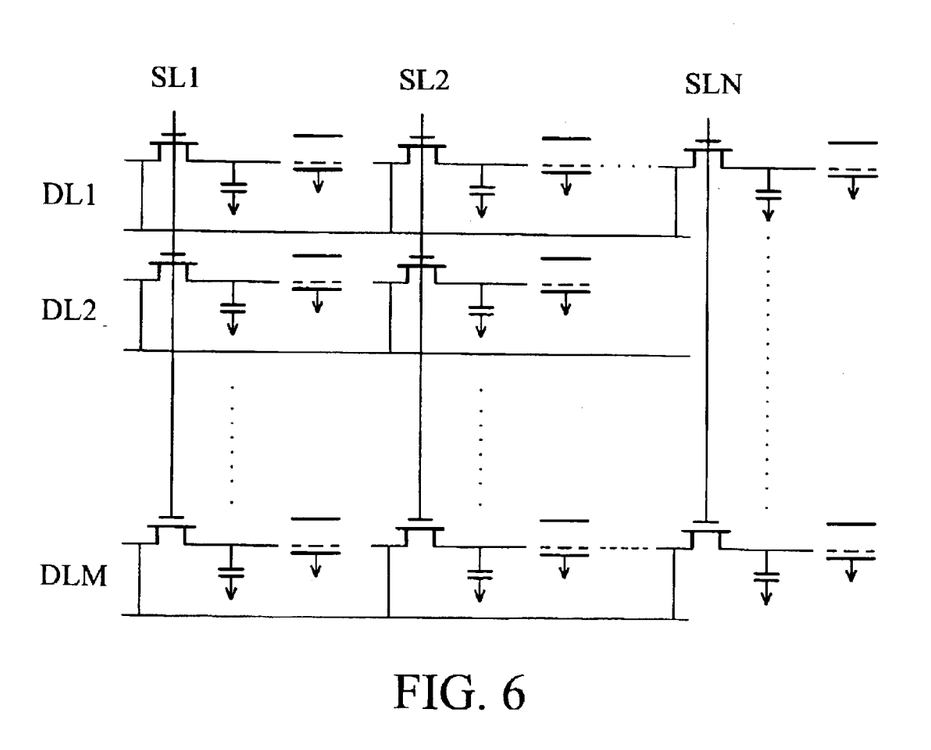
FIG. 6 shows an active control matrix for a CNT-FED of the first embodiment.

FIG. 6 shows an active control matrix for CNT-FED of the first embodiment. As shown in FIG. 6, the active control matrix includes scan lines SL1~SLN, data lines DL1~DLM, active devices T1 disposed at the intersection of scan lines SL1~SLN and data lines DL1~DLM, and CNT-FED. Operation process is described as follows. In the first scan period, the scan line SL1 turns on active devices of the first column and data lines DL1~DLM feed control voltages of the active devices of the first column to capacitors of the first column respectively. Control voltages of the three-electrode CNT-FED 100 of the first column are stored in the capacitors of the first column. In the next scan period, the scan line is inactive and the capacitors of the first column sustain illumination of CNT-FED of the first column until the next time frame when control voltages are rewritten. The scan lines SL2~SLN repeats previous procedures thereby data of the entire frame is completely written.

Figure 7:
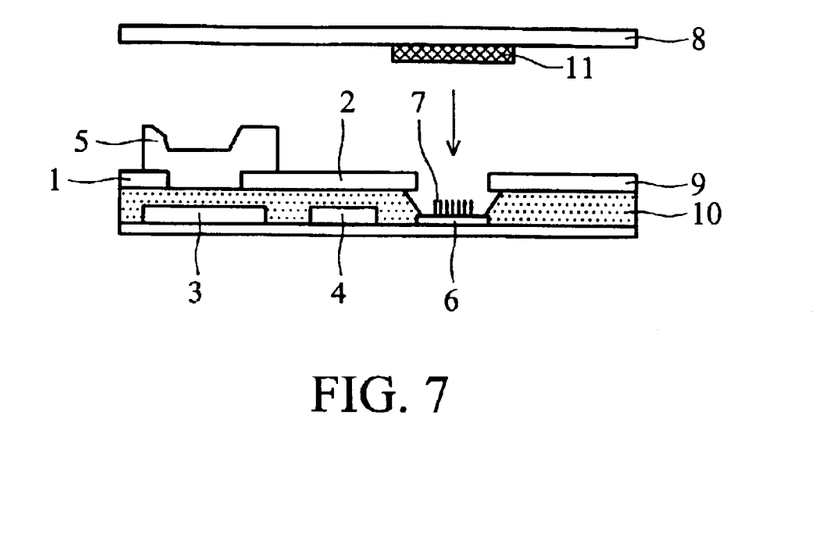
FIG. 7 shows a cross-section of the first embodiment.

FIG. 7 shows a cross-section of the first embodiment. Fabrication process is as follows. The gate 3 of the active device T1 is fabricated first, electrode 4 of the capacitor C1, and cathode 6 of the three-electrode CNT-FED. CNT 7 is formed on cathode 6, and dielectric layer 10 later. Thickness of the dielectric layer 10 is adjustable for various applications. The dielectric layer 10 is applied for the active device T1, the capacitor C1, and the three-electrode CNT-FED 100. Source 1 and drain 2 of the active device T1 is fabricated, and gate 2, and 9 of the three-electrode CNT-FED 100. Semiconductor layer 5 of the active device T1 is fabricated. The lower plate is fabricated completely. Phosphor 11 is disposed on the upper plate 8. The upper plate 8 and the lower plate are assembled, packaged, and vacuumized thereafter the active control and gray-level adjustable CNT-FED is completed. The active device T1 is fabricated by bottom gate, top gate, and trench gate.

The Second Embodiment

Figure 8:
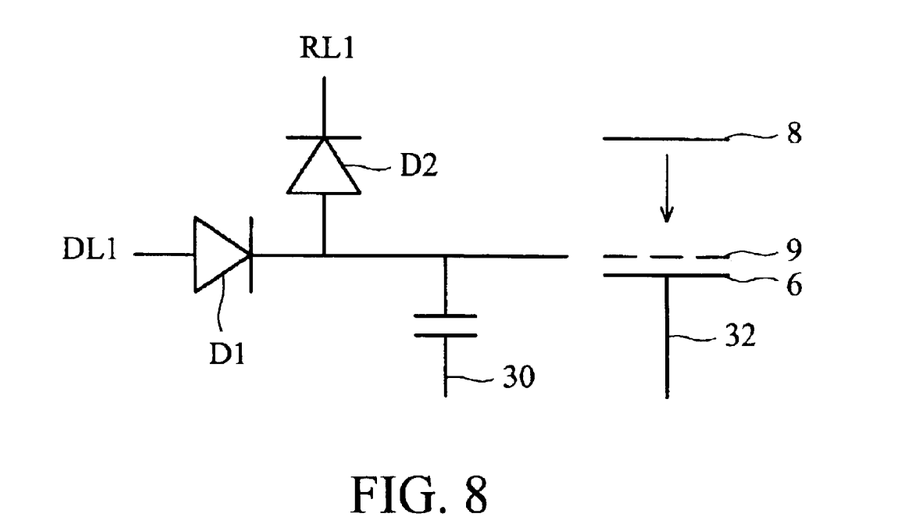
FIG. 8 is a schematic of a CNT-FED with active control in the second embodiment.

FIG. 8 is a schematic of a CNT-FED with active control in the second embodiment. The CNT-FED with active control includes a diode D1, a diode D2, a capacitor C1, and a three-electrode CNT-FED 100 including cathode 6, gate 9, and anode 8. The operating method follows.

Figure 9A:
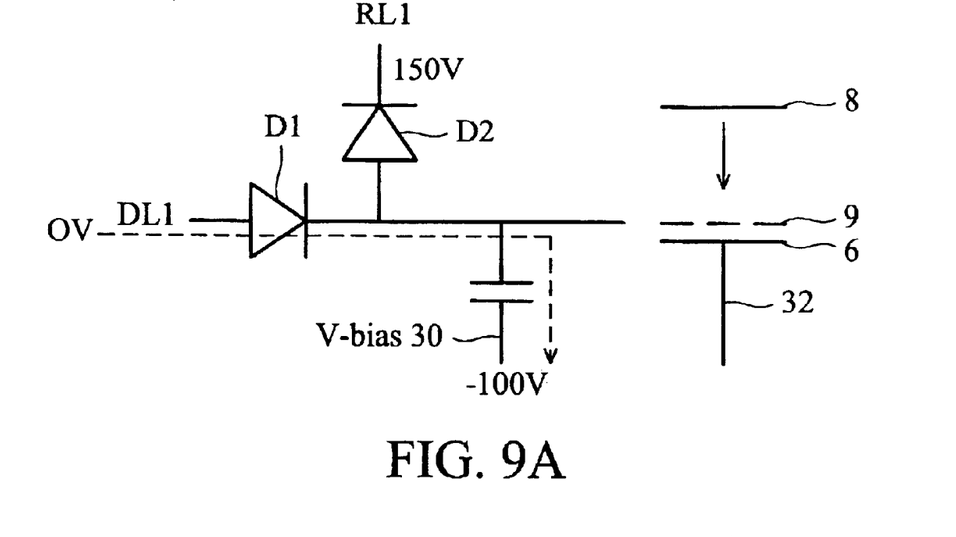
FIGS. 9A–9C shows operations of the second embodiment.
Figure 9B:
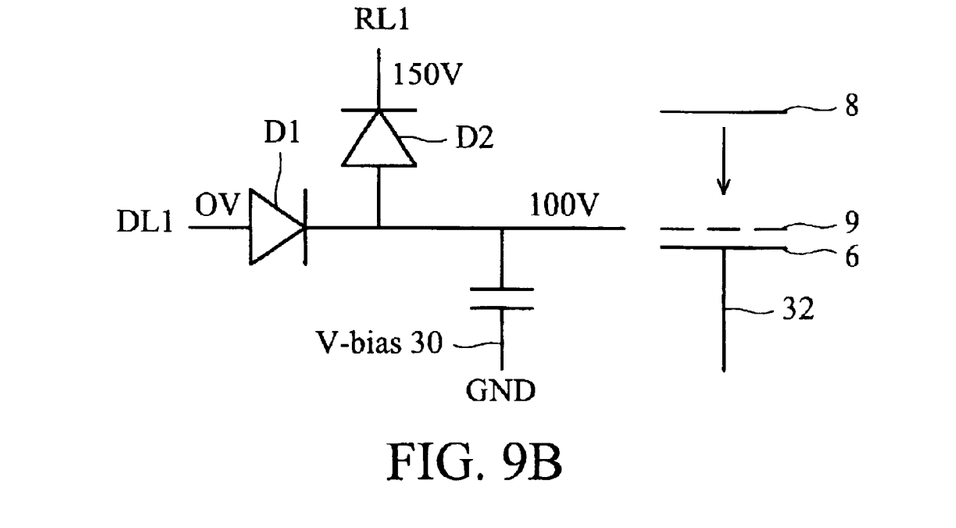
Figure 9C:
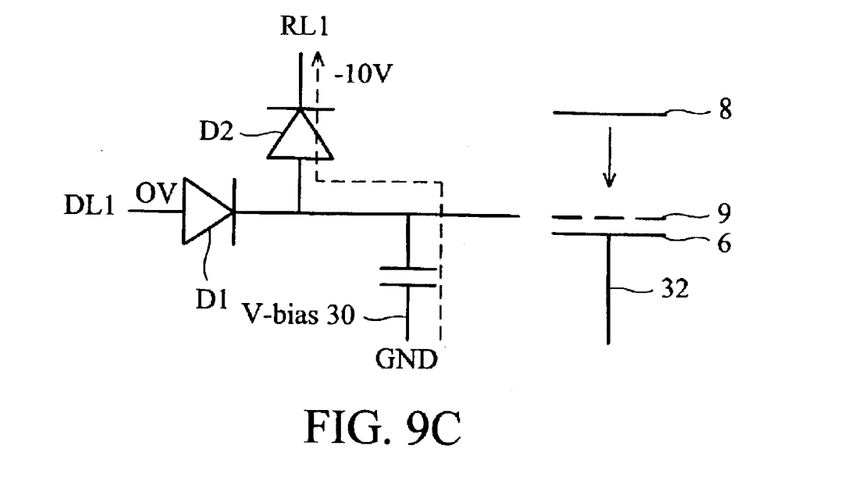

1. As shown in FIG. 9A, in a scan period, a negative-voltage scan signal is fed to V-bias and a first data line DL1 feeds a control voltage to turn on the diode D1. The control gate voltage 9 controls field emission at cathode 6 and achieves adjustment of illumination and gray level. The second data line RL1 feeds a first bias voltage, a positive voltage, thereby the diode D2 is reverse-biased. The capacitor C1 stores control gate voltage 9.
2. As shown in FIG. 9B, in the next scan period, V-bias 30 is coupled to a ground potential and the diode D1 and D2 are reverse-biased. The capacitor C1 holds control voltage in the previous scan period, so the CNT-FED 100 preserves illumination and gray level.
3. As shown in FIG. 9C, the second data line RL1 feeds a second bias voltage, a negative, the diode D2 is forward-biased. The capacitor C1 is discharged. The control gate voltage 9 is cleared.
4. Procedures 1~3 are repeated. The CNT-FED 100 achieves writing data and preserving illumination and gray level.

Figure 10:
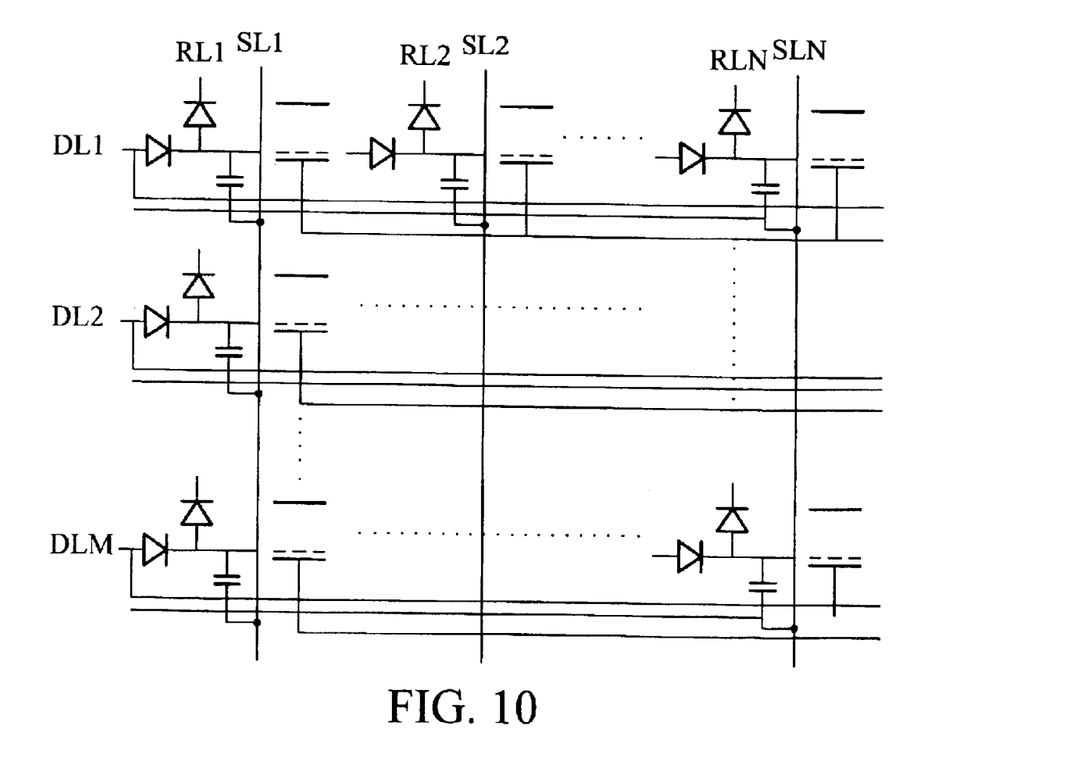
FIG. 10 shows an active control matrix for CNT-FED of the second embodiment.

FIG. 10 shows an active control matrix for CNT-FED of the second embodiment. As shown in FIG. 10, the active control matrix includes the first data lines DL1~DLM, the second data lines RL1~RLN, SCAN lines SL1~SLN, CNT-FED, capacitor C1, and diodes D1 and D2 disposed at the intersection of the first data lines DL1~DLM and the second data lines RL1~RLN. Operation procedures are described as follows. In the first scan period, the scan line SL1 is fed a negative voltage, and the second data line RL1 is fed a first bias voltage, a positive voltage, to turn on the diodes D1 and turn off the diodes D2 of the first column. The data lines DL1~DLM feed control voltages to capacitors of the first column through the diodes D1 respectively. Control voltages of the three-electrode CNT-FED 100 of the first column are stored in the capacitors of the first column. In the next scan period, the first scan line SL1 is at a ground potential and the diodes D1 of the first column are turned off and control voltages of the first column are stored in the capacitors of the first column, thereby sustaining illumination of the three-electrode CNT-FED 100 of the first column until the next time frame when control voltages are rewritten. The scan lines SL2~SLN repeat previous procedures, thereby data of the entire frame is written completely.

Figure 11:
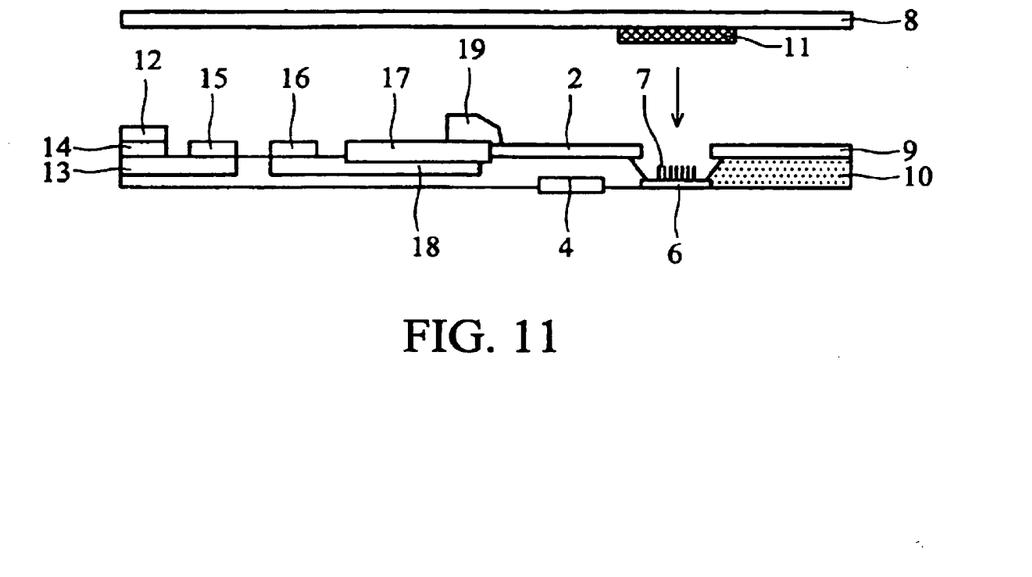
FIG. 11 shows a cross-section of the second embodiment.

FIG. 11 shows a cross-section of the second embodiment. Fabrication process is as follows. An electrode plate 4 of the capacitor C1 is fabricated first, the cathode 6 of the three-electrode CNT-FED 100, and dielectric layer 10 later. Thickness of the dielectric layer 10 is adjustable for various applications. The dielectric layer 10 is applied for the capacitor C1 and the three-electrode CNT-FED 100. P-type semiconductor layers 13 and 18 of the diodes D1 and D2 respectively are fabricated. N-type semiconductor layers 14 and 17 of the diodes D1 and D2 respectively are fabricated. The following are the gate 2 and 9 of the three-electrode CNT-FED 100. The electrodes 12, 15, 16, 19 of the diodes D1 and D2 are fabricated. The lower plate is fabricated completely. Phosphor 11 is disposed on the upper plate 8. The upper plate 8 and the lower plate are assembled, packaged, and vacuumized thereafter the active control and gray-level adjustable CNT-FED is completed. The diodes D1 and D2 are fabricated by bottom gate, top gate, and trench gate.

The Third Embodiment

Figure 12:
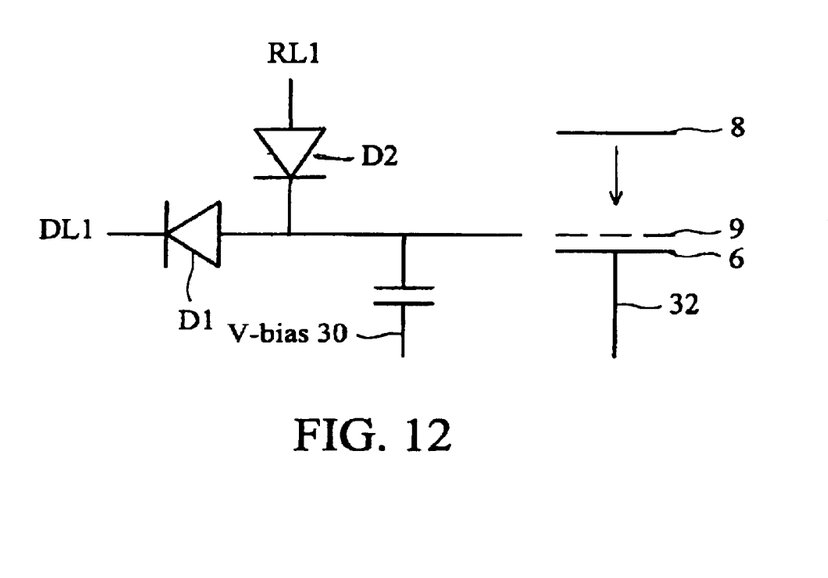
FIG. 12 is a schematic of a CNT-FED with active control in the third embodiment.

FIG. 12 is a schematic of a CNT-FED with active control in the third embodiment. The CNT-FED with active control includes a diode D1, a diode D2, a capacitor C1, and a three-electrode CNT-FED 100 including cathode 6, gate 9, and anode 8. The operating method follows.

Figure 13A:
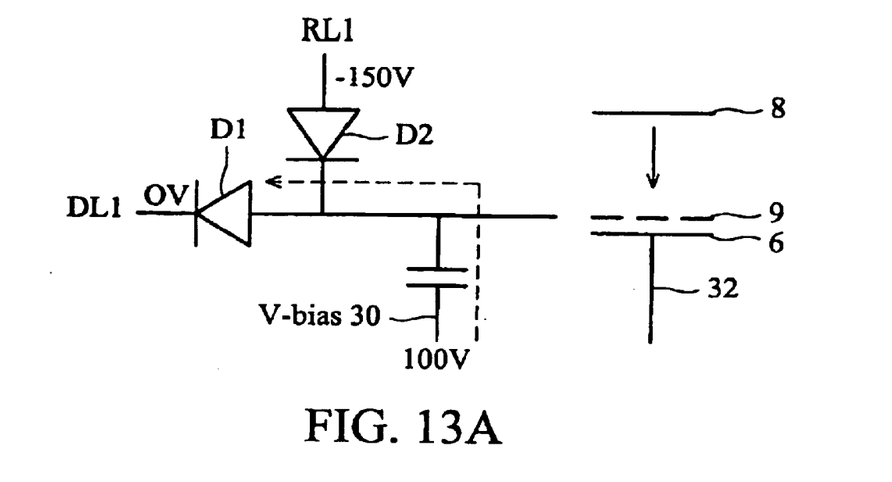
FIGS. 13A–13C shows operations of the third embodiment.
Figure 13B:
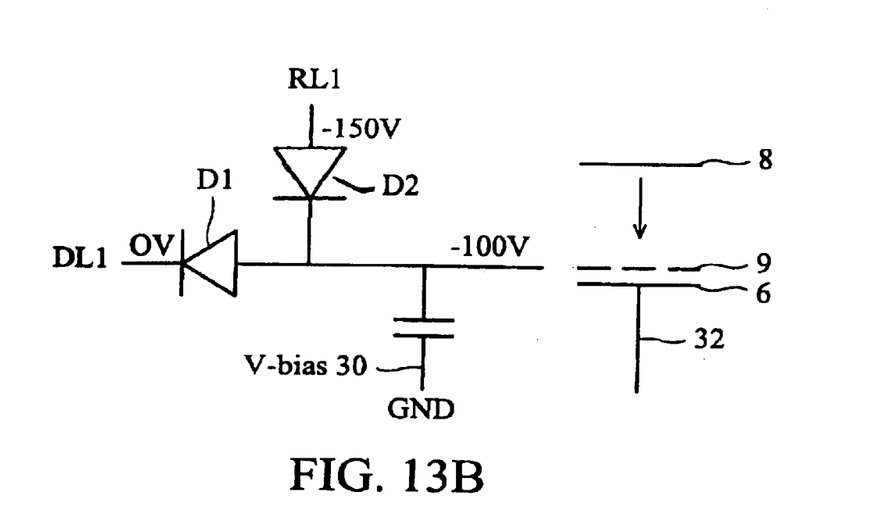
Figure 13C:
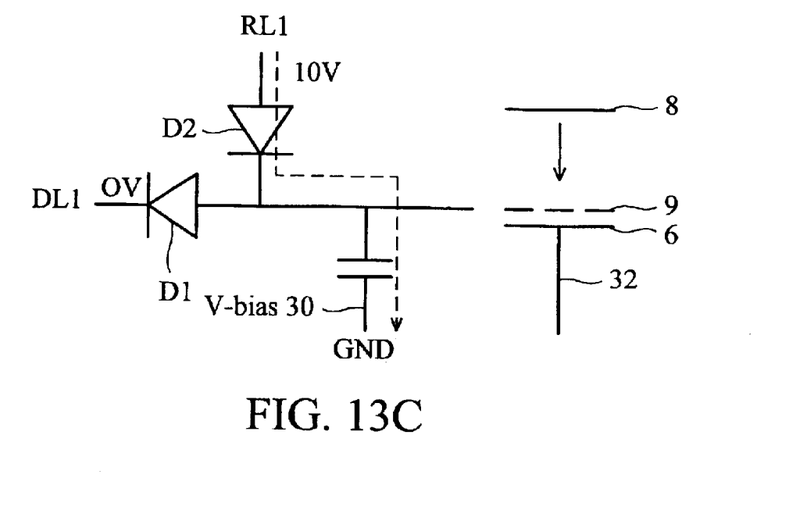

1. As shown in FIG. 13A, in a scan period, a positive scan signal is fed to V-bias 30 and a first data line DL1 feeds a control voltage to turn on the diode D1. The control gate voltage 9 controls field emission at cathode 6 and achieves adjustment of illumination and gray level. The second data line RL1 feeds a first bias voltage, a negative voltage, thereby the diode D2 is reverse-biased. The capacitor C1 stores control gate voltage 9.
2. As shown in FIG. 13B, in the next scan period, V-bias 30 is coupled to a ground potential and the diode D1 and D2 are reverse-biased. The capacitor C1 holds control voltage in the previous scan period, so the CNT-FED 100 preserves illumination and gray level.
3. As shown in FIG. 13C, the second data line RL1 feeds a second bias voltage, a positive, the diode D2 is forward-biased. The capacitor C1 is discharged. The control gate voltage 9 is cleared.
4. Procedures 1~3 are repeated. The CNT-FED 100 achieves writing data and preserving illumination and gray level.

Figure 14:
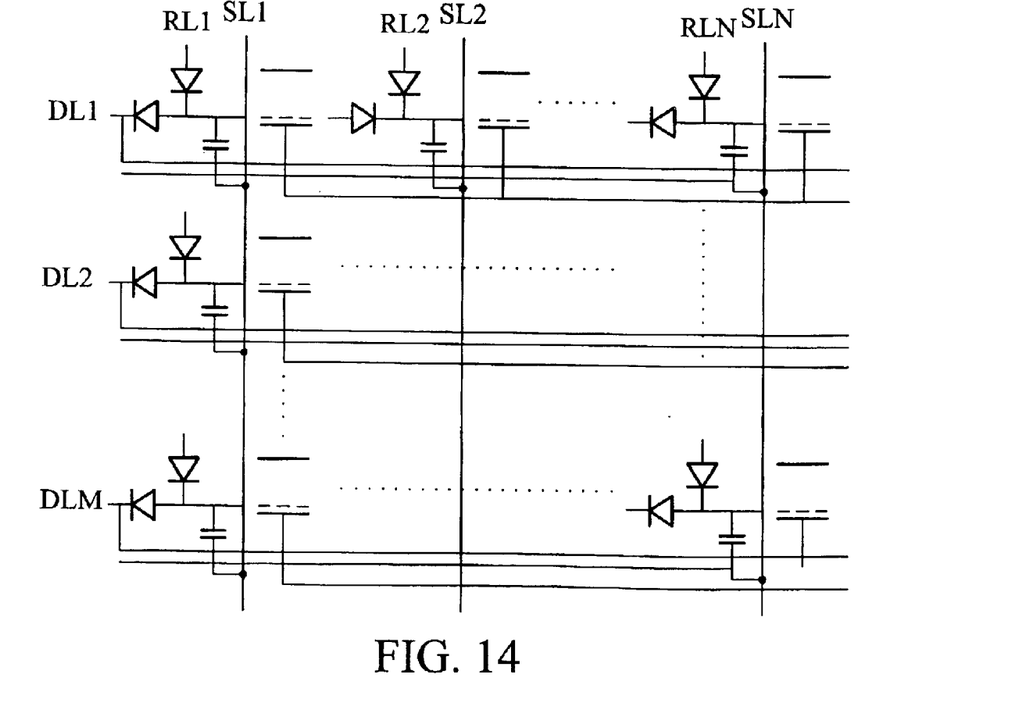
FIG. 14 shows an active control matrix for CNT-FED of the third embodiment.

FIG. 14 shows an active control matrix for the CNT-FED of the third embodiment. As shown in FIG. 14, the active control matrix includes the first data lines DL1~DLM, the second data lines RL1~RLN, SCAN lines SL1~SLN, CNT-FED, capacitor C1, and diodes D1 and D2 disposed at the intersection of the first data lines DL1~DLM and the second data lines RL1~RLN. Operation procedures are described as follows. In the first scan period, the scan line SL1 is fed a positive voltage, and the second data line RL1 is fed a first bias voltage, a negative voltage, to turn on the diodes D1 and turn off the diodes D2 of the first column. The data lines DL1~DLM feed control voltages to capacitors of the first column through the diodes D1 respectively. Control voltages of the three-electrode CNT-FED 100 of the first column are stored in the capacitors of the first column. In the next scan period, the first scan line SL1 is at a ground potential and the diodes D1 of the first column are turned off and control voltages of the first column are stored in the capacitors of the first column thereby sustaining illumination of CNT-FED of the first column until the next time frame when control voltages are rewritten. The scan lines SL2~SLN repeat previous procedures, thereby data of the entire frame is written completely.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A nanotube field emission display comprising:
    a nanotube field emission cell having a cathode, a gate, and an anode, wherein the cathode has nanotube for field emission;
    an active device having a first electrode, a second electrode, and a control electrode, wherein the second electrode is coupled to the gate of the nanotube field emission cell; and
    a capacitor coupled between the gate of the nanotube field emission cell and a voltage source to store gate voltage to control illumination and gray level of the nanotube field emission cell.

2. The nanotube field emission display as claimed in claim 1 further comprising:
    a data line coupled to the first electrode of the active device;
    a scan line coupled to the control electrode of the active device; wherein when the scan line receives a scan signal, the active device is turned on and a data is fed by the data line to the capacitor, when the scan signal is disabled, the active device is turned off and the capacitor stores the data.

3. The nanotube field emission display as claimed in claim 1, wherein the active device is fabricated by thin-film, thick-film, or integrated-circuit process.

4. The nanotube field emission display as claimed in claim 1, wherein the capacitor is fabricated by thin-film, thick-film, or integrated-circuit process.

5. The nanotube field emission display as claimed in claim 1, wherein the nanotube field emission cell is fabricated by thin-film, thick-film, or integrated-circuit process.

6. The nanotube field emission display as claimed in claim 1 further comprising:
    scan lines, data lines, nanotube field emission cells, active devices, and capacitors; wherein the nanotube field emission cells, the active devices, and the capacitors are disposed at intersections of scan lines and data lines, the scan lines are coupled to control electrodes of active devices, the data lines are coupled to the first electrodes of the active devices, and the second electrodes of active devices and capacitors are coupled to gates of nanotube field emission cells.

7. The nanotube field emission display as claimed in claim 6, wherein in a scan period of a frame, a scan signal is fed to a corresponding scan line, and corresponding active devices are turned on, data is fed to corresponding capacitors and gates of nanotube field emission cells through corresponding data lines and active devices, and when the scan signal is disabled, active devices are turned off and capacitors store the data.

8. A nanotube field emission display comprising:
a nanotube field emission cell having a cathode, a gate, and an anode, wherein the cathode has nanotubes for field emission;
a first diode having a first electrode and a second electrode,
wherein the second electrode is coupled to the gate of the nanotube field emission cell;
a second diode having a first electrode and a second electrode, wherein the first electrode is coupled to the gate of the nanotube field emission cell; and
a capacitor coupled between the gate of the nanotube field emission cell and a scan line to store gate voltage to control illumination and gray level of the nanotube field emission cell.

9. The nanotube field emission display as claimed in claim 8, wherein the first electrode of the first diode is an anode, the second electrode of the first diode is a cathode, the first electrode of the second diode is an anode, and the second electrode of the second diode is a cathode.

10. The nanotube field emission display as claimed in claim 8, wherein the first electrode of the first diode is a cathode, the second electrode of the first diode is an anode, the first electrode of the second diode is a cathode, and the second electrode of the second diode is an anode.

11. The nanotube field emission display as claimed in claim 8 further comprising:
a first data line coupled to the first electrode of the first diode;
a second data line coupled to the second electrode of the second diode; and
a scan line coupled to the capacitor; wherein when the first data line receives a control voltage and the scan line receives a scan signal, the first diode is turned on, the second data line receives a first bias voltage, the second diode is turned off, the control voltage is fed to the capacitor by the first data line and the first diode, and when the scan signal is disabled, the first diode and the second diode are turned off, the capacitor stores the data, and when the second data line receives a second bias voltage, the second diode is turned on, and the control voltage of the capacitor is cleared.

12. The nanotube field emission display as claimed in claim 8, wherein the first diode and the second diode are fabricated by thin-film, thick-film, or integrated-circuit process.

13. The nanotube field emission display as claimed in claim 8, wherein the capacitor is fabricated by thin-film, thick-film, or integrated-circuit process.

14. The nanotube field emission display as claimed in claim 8, wherein the nanotube field emission cell is fabricated by thin-film, thick-film, or integrated-circuit process.

15. The nanotube field emission display as claimed in claim 8 further comprising:
scan lines, first data lines, second data lines, nanotube field emission cells, first diodes, second diodes, and capacitors; wherein the nanotube field emission cells, first diodes, second diodes, and capacitors are all disposed at intersections of scan lines and first data lines, the scan lines are coupled to corresponding capacitors, the first data lines are coupled to the first electrodes of the first diodes, the second data lines are coupled to the second electrodes of the second diodes, and the first electrodes of the first diodes and the second electrodes of the second diodes are coupled to capacitors and gates of the nanotube field emission cells.

16. The nanotube field emission display as claimed in claim 15, wherein in a scan period of a frame, a scan signal is fed to corresponding scan lines, the corresponding second data line receives a first bias voltage, second diodes are turned off correspondingly, data is fed to corresponding capacitors and gates of nanotube field emission cells data through corresponding data lines and first diodes, and when the scan signals are disabled, the first diodes are turned off, and capacitors store the data, and during a reset period of another frame, the corresponding second data line receives a second bias voltage, second diodes are turned on correspondingly, and the data stored on capacitors is cleared.

17. A nanotube field emission display comprising:
a nanotube field emission cell having a cathode, a gate, and an anode, wherein the cathode has nanotubes for field emission;
a capacitor coupled between the gate of the nanotube field emission cell and a scan line to store a gate voltage to control illumination and gray level of the nanotube field emission cell;
a first diode having a first electrode and a second electrode, wherein the second electrode of the first diode is coupled to the gate of the nanotube field emission cell; and
a second diode having a first electrode and a second electrode, wherein the first electrode of the second diode is coupled to the gate of the nanotube field emission cell, and the a discharge current flows through the second diode to discharge the gate voltage of the capacitor.

18. The nanotube field emission display as claimed in claim 17, wherein the first electrode of the first diode is an anode, the second electrode of the first diode is a cathode, the first electrode of the second diode is an anode, and the second electrode of the second diode is a cathode.

19. The nanotube field emission display as claimed in claim 17, wherein the first electrode of the first diode is a cathode, the second electrode of the first diode is an anode, the first electrode of the second diode is a cathode, and the second electrode of the second diode is an anode.

20. The nanotube field emission display as claimed in claim 17, further comprising:
a first data line coupled to the first electrode of the first diode;
a second data line coupled to the second electrode of the second diode; and
a scan line coupled to the capacitor;
wherein when the first data line receives a control voltage and the scan line receives a scan signal, the first diode is turned on, the second data line receives a first bias voltage, the second diode is turned off, the control voltage is fed to the capacitor by the first data line and the first diode, and when the scan signal is disabled, the first diode and the second diode are turned off, the capacitor stores the data, and when the second data line receives a second bias voltage, the second diode is turned on, and the control voltage of the capacitor is cleared.

21. The nanotube field emission display as claimed in claim 17, wherein the first diode and the second diode are fabricated by thin-film, thick-film, or integrated-circuit process.

22. The nanotube field emission display as claimed in claim 17, wherein the capacitor is fabricated by thin-film, thick-film, or integrated-circuit process.

23. The nanotube field emission display as claimed in claim 17, wherein the nanotube field emission cell is fabricated by thin-film, thick-film, or integrated-circuit process.

24. The nanotube field emission display as claimed in claim 17, further comprising:

scan lines, first data lines, second data lines, nanotube field emission cells, first diodes, second diodes, and capacitors; wherein the nanotube field emission cells, first diodes, second diodes, and capacitors are all disposed at intersections of scan lines and first data lines, the scan lines are coupled to corresponding capacitors, the first data lines are coupled to the first electrodes of the first diodes, the second data lines are coupled to the second electrodes of the second diodes, and the first electrodes of the first diodes and the second electrodes of the second diodes are coupled to capacitors and gates of the nanotube field emission cells.

25. The nanotube field emission display as claimed in claim 24, wherein in a scan period of a frame, a scan signal is fed to corresponding scan lines, the corresponding second data line receives a first bias voltage, second diodes are turned off correspondingly, data is fed to corresponding capacitors and gates of nanotube field emission cells data through corresponding data lines and first diodes, and when the scan signals are disabled, the first diodes are turned off, and capacitors store the data, and during a reset period of another frame, the corresponding second data line receives a second bias voltage, second diodes are turned on correspondingly, and the data stored on capacitors is cleared.

* * * * *